(12) United States Patent
Bright

(10) Patent No.: US 8,833,701 B2
(45) Date of Patent: Sep. 16, 2014

(54) MOISTURE DISPERSION

(75) Inventor: Christopher G Bright, Derby (GB)

(73) Assignee: Rolls-Royce PLC, London (GB)

( * ) Notice: Subject to any disclaimer, the term of this patent is extended or adjusted under 35 U.S.C. 154(b) by 180 days.

(21) Appl. No.: 13/370,870

(22) Filed: Feb. 10, 2012

(65) Prior Publication Data

US 2013/0206912 A1  Aug. 15, 2013

(51) Int. Cl.
*B64D 1/00* (2006.01)

(52) U.S. Cl.
USPC .......................................................... 244/136

(58) Field of Classification Search
USPC ............... 244/136; 239/2.2, 14.2, 132, 132.1; 62/601; 60/39.5
See application file for complete search history.

(56) References Cited

U.S. PATENT DOCUMENTS

| | | | |
|---|---|---|---|
| 5,110,502 A | 5/1992 | Singh | |
| 7,686,253 B2 * | 3/2010 | Lewis et al. | 244/136 |
| 8,402,736 B2 * | 3/2013 | Noppel et al. | 60/39.5 |
| 2010/0132330 A1 * | 6/2010 | Noppel et al. | 60/39.5 |
| 2010/0133383 A1 * | 6/2010 | Lewis et al. | 244/136 |
| 2010/0133384 A1 * | 6/2010 | Lewis et al. | 244/136 |

FOREIGN PATENT DOCUMENTS

| | | |
|---|---|---|
| JP | A-2007-151466 | 6/2007 |
| RU | 2000690 C1 | 10/1993 |
| RU | 2 191 499 C2 | 10/2002 |
| WO | WO 2008/145953 A2 | 12/2008 |

OTHER PUBLICATIONS

Search Report issued in British Patent Application No. GB0919806.0 dated Dec. 11, 2009.
Combined Search and Examination Report issued in British Patent Application No. GB0919806.0 dated Dec. 14, 2009.

* cited by examiner

*Primary Examiner* — Philip J Bonzell
(74) *Attorney, Agent, or Firm* — Oliff PLC

(57) ABSTRACT

A method of reducing the amount of water in a region of air including: forming seed ice crystals; dispensing the seed ice crystals towards the region of air; allowing water in the region of air to freeze or deposit onto the seed ice crystals; and allowing the resulting ice crystals to move from the region of air so as to reduce the amount of water in the region of air. An ice crystal seeding assembly arranged to reduce the amount of water in a region of air, the seeding assembly includes an ice crystal seeder and dispensing means, the dispensing means being arranged to dispense seeded ice crystals towards the region of air so that water in the region of air freezes or deposits onto the seed ice crystals and that the resulting ice crystals move from the region of air.

8 Claims, 3 Drawing Sheets

MOISTURE DISPERSION

This invention relates to a method of reducing the amount of water in a region of air and particularly but not exclusively relates to dispersing the contrails of a jet engine by ice seeding.

Aircraft contrails are formed when water vapour in the engine exhaust condenses in cold air. This forms a distinctive white trail behind an aircraft, especially if the aircraft is flying high where the air is very cold. Contrails may also be referred to as "vapour trails" or "condensation trails".

Condensation in contrails begins around condensation nuclei which form sites for condensation. Typically, these nuclei include naturally occurring particles such as dust, salt crystals (from sea spray) and ions formed by cosmic rays. Soot and sulphur particles from combustion in the engine also provide condensation nuclei.

The water vapour in the engine exhaust comprises water vapour already present in the air drawn into the engine for combustion, plus water vapour formed by the combustion of hydrogen in the engine fuel used. Even if the ambient air surrounding the aircraft is unsaturated with water vapour, a contrail may form due to local super-saturation caused by the water vapour produced by combustion. However, the mixing of the contrail with the overall unsaturated air will cause the contrail to evaporate relatively quickly, typically in less than a minute. It has been suggested that such short-lived contrails are unlikely to significantly affect the weather or climate.

However, more persistent contrails will form if the ambient air is supersaturated with water vapour. The aircraft acts as a seeding agent that encourages condensation and/or deposition from water vapour in the ambient air so that the amount of liquid water or ice in the contrail is far greater than the amount of water produced by the combustion of fuel. The contrail then grows steadily. In some weather conditions along heavily used aircraft routes, contrails can cover much of the sky and may persist for several minutes and even over an hour.

This coverage has caused concern amongst some people who believe that contrails can affect the weather and climate. For example, the contrails may reflect sunlight away form the Earth, thereby causing cooling by day. Alternatively, the contrails may reflect infra-red radiation emitted from the Earth back to the surface, thereby contributing to global warming. These claims are disputed but nevertheless either possibility is undesirable. Consequently, a means of dispersing contrails would allay concerns about their effect on weather and climate and mitigate this possible threat to air travel.

To this end, WO08145953A describes a method and apparatus for suppressing aeroengine contrails by directing electromagnetic radiation at the exhaust plume. The radiation heats particles in the aircraft exhaust and induces heat in the plume to evaporate the water or ice patches or otherwise prevent or disrupt the condensation of water vapour, thereby avoiding the formation of contrails. By contrast, WO08145954A describes a method and apparatus for suppressing aeroengine contrails by directing ultrasonic waves at the exhaust plume to avoid the formation of contrails.

However, heating the contrail by such methods would need prohibitive amounts of power. The power required to produce the electromagnetic radiation or ultrasound would normally be provided by generators driven by the engines. The consequences would be a significant drain on the engine power and prohibitively heavy generating and transmitting equipment.

The present invention therefore seeks to address these issues.

According to a first aspect of the present invention there is provided a method of reducing the amount of water in a region of air, the method comprising: forming seed ice crystals; dispensing the seed ice crystals towards the region of air; and allowing water in the region of air to freeze or deposit onto the seed ice crystals; such that the resulting ice crystals move from the region of air so as to reduce the amount of water in the region of air.

The seed ice crystals may be formed by producing ions in the air such that ions act as condensation nuclei on which water vapour in the air can condense to form seed ice crystals The air may be irradiated so as to produce the ions. For example, the air may be irradiated by one or more of microwaves, ultra-violet radiation, X-rays, gamma rays, corpuscular radiation and lasers or any other form of radiation. Alternatively, an electrical potential may be applied to the air so as to produce the ions. For example, an alternating potential difference (i.e. AC) or a constant potential difference (i.e. DC) may be applied to the air.

The seed ice crystals may be formed by: providing compressed air comprising water vapour; cooling the compressed air; and expanding the compressed air so that the air may be further cooled to below the dew point of the air, and so that seed ice crystals may be formed. The compressed air may be provided from one of a gas turbine engine compressor, a dedicated compressor and a converging nozzle. The compressed air may be cooled by de-icing a surface, for example a surface of an aircraft or an aircraft engine. The seed ice crystals may be provided with an electrical charge.

The seed ice crystals may be formed by: spraying water into the air; and allowing the water to freeze.

The method may further comprise pivoting and/or translating the direction in which the seed ice crystals are directed. The method may further comprise allowing the resulting ice crystals to move from the region of air under action of gravity According to a second aspect of the present invention there is provided an ice crystal seeding assembly arranged to reduce the amount of water in a region of air, the ice crystal seeding assembly comprising: an ice crystal seeder arranged to form seed ice crystals and to dispense the seed ice crystals towards the region of air so that water in the region of air freezes or deposits onto the seed ice crystals and that the resulting ice crystals move from the region of air so as to reduce the amount of water in the region of air.

The ice crystal seeder may comprise an ion producer. The ion producer may comprise a radiation transmitter, for example the radiation transmitter may transmit one or more of microwaves, ultra-violet radiation, X-rays, gamma rays, corpuscular radiation and lasers. The ion producer may comprise a source of electrical energy for applying an electrical potential to the air so as to produce the ions. For example, an alternating potential difference (i.e. AC) or a constant potential difference (i.e. DC) may be applied to the air.

The ice crystal seeder may comprise one or more of: a compressor arranged to compress air comprising water vapour; a heat exchanger arranged to cool the compressed air; and an expander arranged to expand the compressed air so that the air may be further cooled to below the dew point of the air such that ice crystals may be formed. The compressor may comprise one of a gas turbine engine compressor, a dedicated compressor and a converging nozzle. The heat exchanger may comprise a de-icer arranged to de-ice a surface. The ice crystals seeder may comprise a source of electrical energy arranged to provide the ice crystals with an electrical charge.

The dispenser may be pivotable and/or translatable so as to alter the direction in which the seed ice crystals are directed.

A gas turbine engine may comprise the ice crystal seeding assembly described above.

According to a third aspect of the present invention there is provided a method of reducing the amount of water in a region of air, the method comprising: providing radiation from a source of radiation; directing the radiation from the source towards the region of air; and forming seed ice crystals in the region of air; such that the resulting ice crystals move from the region of air so as to reduce the amount of water in the region of air.

According to a fourth aspect of the present invention there is provided an ice crystal seeding assembly arranged to reduce the amount of water in a region of air, the ice crystal seeding assembly comprising: a source of radiation; and a directing assembly arranged to direct radiation from the source towards the region of air so that water in the region of air forms seed ice crystals and that the resulting ice crystals move from the region of air so as to reduce the amount of water in the region of air.

According to any aspect of the invention, the seed ice crystals formed may be substantially 1000 μm in diameter. Similarly, the region of air may be downstream of one or more of an engine exhaust, a jet engine, a chimney, a cooling tower and a combustion exhaust. Likewise, the seed ice crystals may be dispended: above an engine of an aircraft, around the engine exhaust nozzle, within a bypass duct or on the aircraft wing, empennage or fuselage.

Any of the preferable features described in relation to any one aspect may be applied to another aspect wherever it is practicable to do so.

For a better understanding of the present invention, and to show more clearly how it may be carried into effect, reference will now be made, by way of example, to the accompanying drawings, in which.

Figure 1:
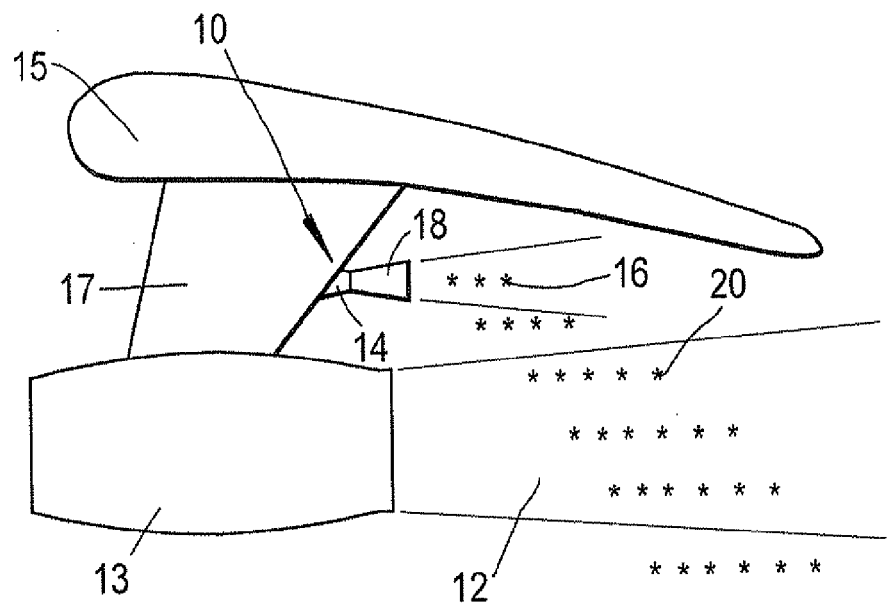
FIG. 1 shows a general arrangement for contrail dispersion according to an example of the present invention.
Figure 2:
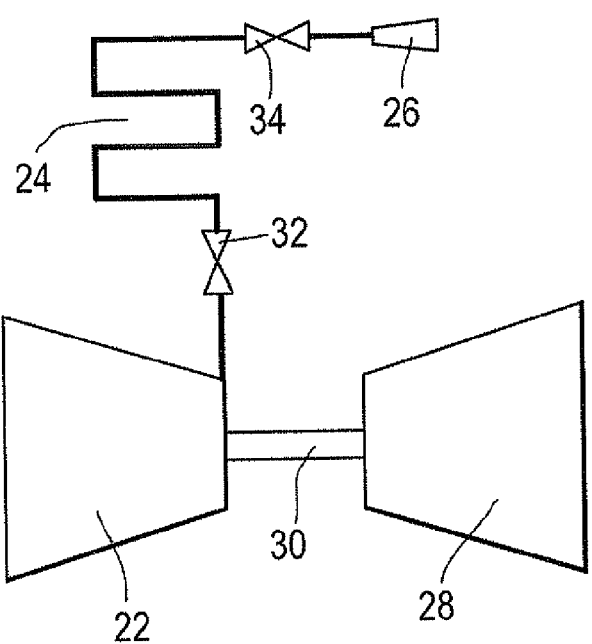
FIG. 2 shows an arrangement for producing seed ice crystals from compressed air according to an example of the present invention.

With reference to FIG. 1 an ice crystal seeding assembly 10 according to the present invention is arranged to reduce the amount of water in a region of air 12. The ice crystal seeding assembly 10 comprises an ice crystal seeder 14 arranged to form seed ice crystals 16. The ice crystal seeding assembly 10 further comprises a dispenser or seeding nozzle 18 arranged to dispense the seed ice crystals 16 towards the region of air 12 so that water in the region of air freezes or deposits onto the seed ice crystals. The resulting ice crystals 20 move from the region of air 12 so as to reduce the amount of water in the region of air. The resulting ice crystals 20 may move from the region of air 12 by virtue of gravity and/or their momentum imparted to them by the dispenser 18.

In particular, the present invention may be applied to a contrail formed by a jet engine 13, with the region of air 12 corresponding to the jet engine exhaust and subsequent contrail. The engine 13 may be mounted to an aircraft wing 15 via a support 17. The present invention may however be applied to other exhausts such as the funnels of marine vessels and the chimneys and cooling towers of power stations and factories and other premises.

The contrail dispersion method described above may seed the engine exhaust gas with ice crystals to provide condensation nuclei. Water vapour will condense on these seed ice crystals, removing some of the water vapour from the exhaust gas. The dispenser 18 is placed more or less above the engine exhaust so that the seed ice crystals 16 fall through the engine exhaust by virtue of gravity, so that the water vapour in the engine exhaust condenses on the seed ice crystals.

The seeding ice particles may be approximately 1000 μm in diameter. Radar research carried out by the UK Met Office shows that natural cirrus clouds, the high icy clouds similar to contrails, have a range of particle sizes, the largest tending to be 1000 μm in diameter. The persistence of natural cirrus indicates that the ice particles smaller than 1000 μm fall very slowly. The ice seeding particles may therefore be greater than 1000 μm in diameter to ensure that the ice crystals fall under the action of gravity. However, few cirrus cloud particles are above 1000 μm in diameter, indicating that if particles much larger than this form, they will fall quickly. Therefore, the ice seeding mechanism should optimally produce ice seeding particles that are about 1000 μm in diameter. These will grow above this size as water vapour freezes to them, and they will subsequently fall rapidly, thereby dispersing the contrail.

An advantage of seeding the exhaust gas with ice crystals is that the contrail will disperse more quickly than otherwise. This happens because the seed ice crystals will be larger than most other condensation nuclei present and will provide a much greater surface area upon which water vapour can condense. This will tend to remove water vapour from the exhaust gas more quickly than otherwise. Furthermore, the seed ice crystals with additional ice produced by condensation will be much larger than ice particles produced by condensation on other condensation nuclei. This means that the volume to surface area ratio of the ice crystals generated with the present invention will be greater. As a consequence of the greater volume to surface area ratio, the opacity of the contrail will be reduced, thereby reducing its visibility and its effect on sunlight and infra-red radiation. Furthermore, the greater volume to surface area ratio translates to a greater mass to surface area ratio. Therefore the seed ice crystals will fall more quickly than other ice particles, aiding dispersion. The falling of ice particles (seed or otherwise) helps dispersion because the ice particles will either fall to a level where the air is unsaturated with water vapour and the ice particles will sublime, or the ice particles will continue to fall, eventually reaching the ground.

Further still the present invention avoids the need to carry any chemicals to disperse contrails. This avoids: the health and safety implications of releasing such chemicals into the environment; having to make such chemicals available at airports; and the weight penalty of carrying the chemicals. The present invention additionally avoids having to heat the contrail to prevent condensation, thereby minimising the energy required when compared to the prior art solutions.

According to a first example of the present invention, the seed ice crystals 16 may be formed by spraying water into the air; and allowing the water to freeze. The water could be carried by the aircraft, although this would add to take-off weight. Furthermore, the weight of water needed would have to be determined according to forecast weather conditions en route that are likely to cause persistent contrails. The inevitable difficulty in forecasting such conditions and the possibility of flight diversions means that either some extra water would have to be carried as a precaution or accepting that contrail dispersion would not be possible once the water supply had been exhausted.

Suitable nozzle design allows control of the droplet size and dispersion thereof Within the spray.

With reference to FIG. 2, the ice crystal seeder 14 according to a second example of the present invention may comprise a compressor 22, a heat exchanger 24 and an expander 26. The compressor 22 is arranged to compress air comprising water vapour and the heat exchanger 24 is arranged to cool the compressed air. The expander 26 may be in the form of a nozzle and acts as the dispenser 18. The expander 26 is arranged to expand the compressed air so that the air is further cooled to below the dew point of the air such that the seed ice crystals 16 are formed. In other words, the seed ice crystals 16 may be formed by providing compressed air comprising water vapour; cooling the compressed air; and expanding the compressed air so that the air is further cooled to below the dew point of the air. The ambient air is compressed and then expanded adiabatically though the expander 26. The hot compressed air passes through the heat exchanger 24, which cools the air prior to the expansion in the expander 26. The air is then expanded adiabatically through the expander 26. The adiabatic expansion cools the air below its dew point, thereby producing seed ice crystals 16.

The heat produced by the heat exchanger 24 may be used for various purposes such as cabin heating, fuel heating, and de-icing. In particular, the heat exchanger 24 may be integrated with a de-icing system. The heat exchanger 24 may comprise one or more tubes that run along a surface requiring de-icing. The expander 26 may be connected to an end of one such tube and the air that had been used for de-icing is expanded to form seed ice crystals 16.

In the particular example shown in FIG. 2, the compressed air is provided from the jet engine's compressor, which is connected to a turbine 28 via a shaft 30. For example, air is bled from the gas turbine engine compressors for various purposes: cabin pressurization, de-icing and pneumatic actuation. Air could be bled from the engine compressor in a similar manner to supply the ice crystal seeder 14. The example shown in FIG. 2 further comprises an air bleed control valve 32 and an expander control valve 34 in order to control the flow of air and seed ice crystals 16.

Alternatively, the compressed air may be provided by a dedicated compressor or a converging nozzle. For example, air for the ice crystal seeder 14 may be bled from a compressor installed for other purposes. The designs of "more electric" aircraft are tending to avoid bleeding air from the engine compressor and so compressed air for the ice crystal seeder 14 may not be available from that source. Instead, electric compression may be used to pressurise the cabin and so air from that electric compressor may be used to supply the ice crystal seeder 14 also, recognizing that the compressor would have to be designed for both duties.

Furthermore, a dedicated compressor supplied by mechanical power from the engine either through a gear or otherwise could provide the compressed air. This would suit engines such as piston engines which may not have a compressor. Alternatively, a dedicated electrical compressor could offer greater flexibility in supplying the ice crystal seeder 14 with compressed air. For example, the compressor could be located closer to the ice crystal seeder 14 than otherwise.

Advantageously, with the second example of the present invention, the seed ice crystals are obtained from the water vapour in the ambient air. This is particularly beneficial as the saturated or supersaturated air which produces persistent contrails also provides a plentiful supply of water vapour for producing the seed ice crystals. The second example of the present invention also makes use of compressed air which is readily available on most aircraft.

Furthermore, the exhaust air from the expander 26 will have a much lower relative humidity than the surrounding air. The expansion can be arranged so that the expander exhaust air is unsaturated, thereby further discouraging contrail formation since the mixing of the seed nozzle exhaust air with the engine exhaust gas will lower the relative humidity of the engine exhaust gas.

The expander 26 may be moved up or down by an actuator to vary the height of the nozzle above the engine exhaust. This would be used to control the point of entry of the seed ice crystals 16 into the engine exhaust. If the point of entry is too close to the engine, the exhaust gas may be hot enough to melt or even evaporate the ice crystals, thereby losing their seeding function. On the other hand, if the point of entry is too far from the engine, significant condensation onto other condensation nuclei will have already occurred, reducing the effectiveness of the seeding.

The expander 26 may be pivoted so that the nozzle exhaust can be pitched up or down or yawed from side to side. The pitch angle may help control the point of entry of the seed ice crystals into the engine exhaust. The yaw angle may compensate for cross-winds.

A seeding nozzle in the form of an expander placed above an engine has been described. However, seeding nozzles could be placed elsewhere on the aircraft in order to condense water from supersaturated ambient air. This will produce a region of unsaturated air which will eventually mix with the contrail so that ice crystals within the contrail will sublime. Seeding nozzles could also be placed around the perimeter of the engine nozzle. An advantage of this location is that the position of the seeding nozzles could be largely independent of the design of the airframe. Seeding nozzles could also be placed within the bypass duct of an engine.

The seed ice crystals 16 may be provided with an electrical charge and this may be achieved in a number of ways. For example, the seed ice crystals 16 may be charged by virtue of frictional electrostatic charging. Lining or making the expander 26 with an electrical insulator would electrically charge the seed ice crystals 16 by frictional charging. This would aid condensation since water molecules are electrically polarised and so an electrically charged ice particle would attract more water molecules than an uncharged ice particle.

Alternatively, the seed ice crystals 16 may be charged by virtue of electrical charging by impressed ionisation. Previously-proposed designs of ionisers could be installed inside the expander 26 or around a rim of the expander 26 in order to electrically charge the seed ice crystals 16. The ionisers may apply a high voltage to sharp metal points so that the points produce an electrically charged flow of air known as an "electric wind". This electric wind would charge the seed ice crystals 16.

Further still, the seed ice crystals 16 may be charged by corona discharge. Aircraft often acquire an electrical charge due to flight though dust or snow. The electrical charge may be often drained away through "wicks", which are sharp points connected to various locations on the airframe. The wicks discharge the aircraft through corona discharge. Installing such wicks around a rim of the expander 26, would electrically charge the ice crystals. Alternatively the rim could be made with serrations and/or sharp edges to serve the same purpose.

Electrical charging of the seed ice crystals 16 would produce an opposite electrical charge on the aircraft, which may be undesirable. This may be overcome by using several expanders with different electrically insulating linings so that some expanders produce seed ice crystals 16 with electrical charge of one polarity and the remaining expanders produce seed ice crystals 16 with an electrical charge of the opposite polarity. Seeding may be controlled so that the aircraft remains uncharged and the ice seeding may be operated to electrically discharge an aircraft.

Figure 3:
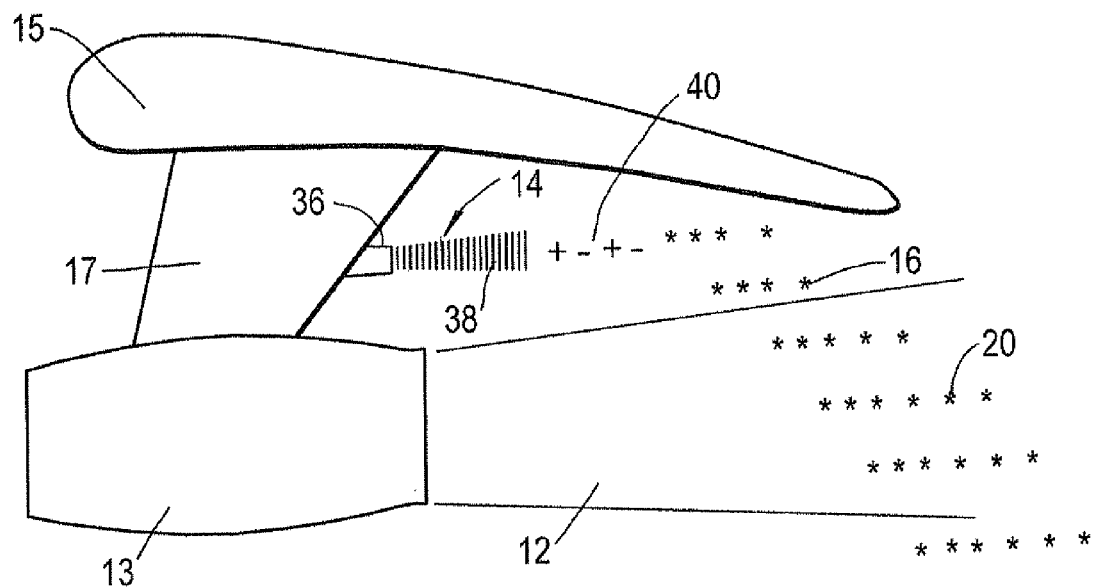
FIG. 3 shows an arrangement for contrail dispersion by electrical ionization according to an example of the present invention.

With reference to FIG. 3, the ice crystal seeder 14 according to a third example of the present invention may comprise a radiation transmitter 36. Ionising radiation 38 is passed though air which is supersaturated with vapour. The ionising radiation produces ions 40 that act as condensation nuclei on which the vapour condenses. This makes visible the path of the ionizing radiation. The contrail dispersion method according to the third example uses radiation, electromagnetic or corpuscular, to ionise the air just above the engine exhaust gas. The ions formed will provide condensation nuclei on which water vapour will condense to form ice crystals. As for the first and second examples, these ice crystals act as seed crystals 16 and as the resulting ice crystals 20 fall through the engine exhaust, water vapour from the exhaust will condense on those crystals, removing some of the water vapour from the exhaust gas.

The purpose of the radiation used in the third example of the present invention is different to that described in the prior art. The purpose of the radiation proposed in this invention is to ionize the air rather than heating it, although it is acknowledged that some heating of the air may occur. The ionisation in turn offers lower energy costs and lower equipment cost compared with the prior art, which relies upon heating the contrail or condensation nuclei in the contrail to prevent condensation.

Figure 4:
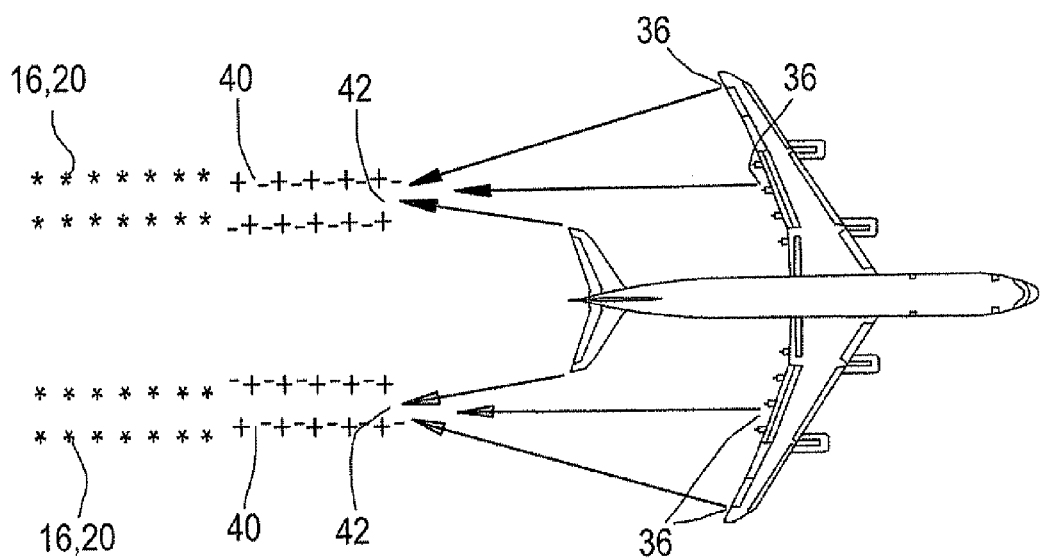
FIG. 4 shows an arrangement for contrail dispersion by radiation according to an example of the present invention.

As shown in FIG. 4, the ice crystal seeder 14 may comprise a plurality of radiation transmitters 36. The radiation transmitted from the plurality of transmitters may converge at one or more pre-selected locations 42. A constructive interference of the radiation at these pre-selected locations would ensure electrical breakdown occurs primarily at the pre-selected locations and without causing electrical breakdown at any of the transmitters 36.

Possible sources of ionising radiation include one or more of microwaves, ultra-violet radiation, X-rays, gamma rays, corpuscular radiation and lasers or any other form of ionising radiation. For example, such lasers as are being used in multimode directed energy armament systems may be used. Lasers of this type may produce ionised paths through the air several tens of meters long.

Alternatively, a laser similar to that being developed by the Japanese National Institute of Advanced Industrial Science and Technology and Keio University may be used. The laser being developed will produce electrical breakdown of the air to produce luminous points. The laser can be scanned in a way similar to a TV raster in order to produce luminous images for advertising and other purposes. A by-product would be ionisation of the air which would produce the required condensation nuclei. Further still, a laser beam similar to the lasers being considered for guiding lightning away from vulnerable objects could be used. Such lasers induce ionised breakdown channels, which act as an alternative path for lightning, and similar laser technology could be used to ionise the air in the vicinity of an engine exhaust.

The radiation may comprise microwaves transmitted from one or more transmitters. The transmitters could be focused to one or more locations ahead or behind the aircraft in order to electrically break down the air at those chosen locations and produce ions. Similarly, ultraviolet rays could be generated by known sources such as light emitting diodes or discharge tubes in order to ionise the air. X rays may also ionise the air and could be generated by known sources such as X-ray tubes.

The radiation may alternatively comprise gamma rays and/or corpuscular radiation, for example, neutrons, alpha and beta particles. Such radiation may be provided by various previously-proposed radioactive sources. Radioactive sources of this type on an aircraft may require shielding.

The radiation transmitter 36 may be moved up or down to vary the height of the transmitter above the engine exhaust. This would be used to control the point of entry of the seed ice crystals 16 into the engine exhaust. If the point of entry is too close to the engine, the exhaust gas may be hot enough to melt or even evaporate the ice crystals, thereby losing their seeding function. On the other hand, if the point of entry is too far from the engine, significant condensation onto other condensation nuclei will have already occurred, reducing the effectiveness of the seeding.

The radiation transmitter 36 may be pivoted so that the nozzle exhaust can be pitched up or down or yawed from side to side. Alternatively, the ionising radiation beam may be pitched up or down or from side to side by using moveable mirrors, lenses, or phased arrays. The pitch angle may help control the point of entry of the seed ice crystals into the engine exhaust. The yaw angle may compensate for crosswinds.

Whilst the radiation transmitter 36 placed above an engine has been described, a radiation transmitter could be placed elsewhere on the aircraft in order to condense water from supersaturated ambient air. This will reduce the saturation in the ambient air discouraging the formation and persistence of a contrail. Radiation transmitters could also be placed around the perimeter of the engine nozzle. An advantage of this location is that the position of the radiation transmitters could be largely independent of the design of the airframe. Radiation transmitters could also be placed within the bypass duct of the engine.

Figure 5:
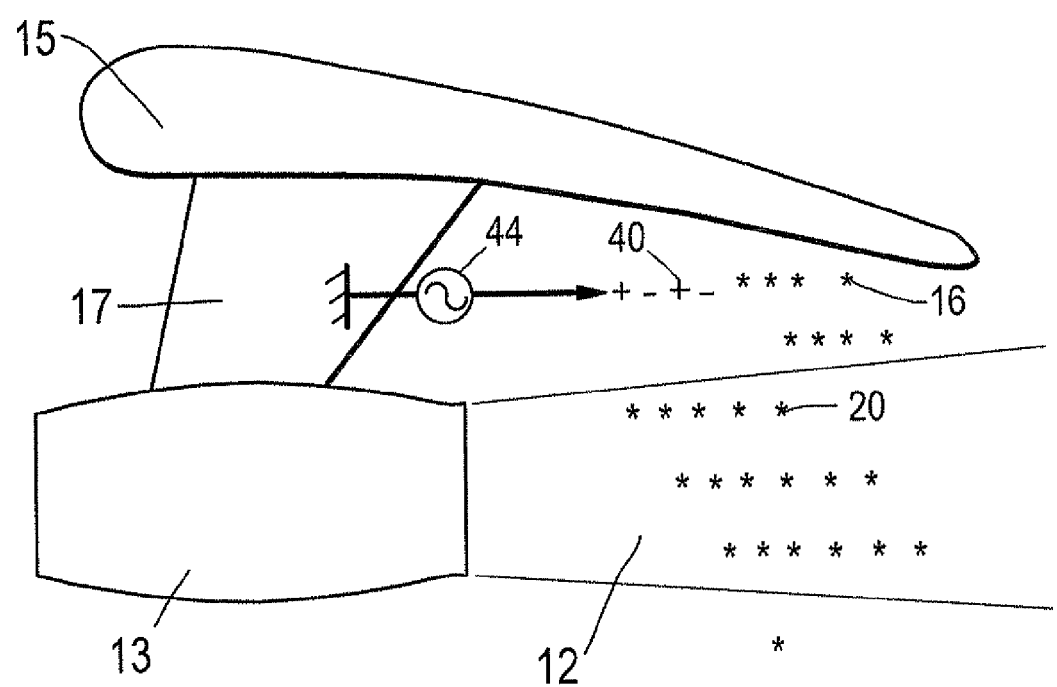
FIG. 5 shows an arrangement for contrail dispersion by electrical ionization according to an example of the present invention.

With reference to FIG. 5, the ice crystal seeder 14 according to a fourth example of the present invention may comprise a source of electrical energy 44 for applying an electrical potential to the air so as to produce ions. The source of energy 44 may take the form of a charging means and may use electric corona discharge from sharp electrodes charged to a high voltage. These electrodes may be referred to as "seeding" electrodes. The charged electrodes will ionize the air and produce ions 40. The ions 40 formed will provide condensation nuclei on which water vapour will condense to form seed ice crystals 16. As for the first, second and third examples, these ice crystals act as seed crystals 16 and as the resulting ice crystals 20 fall through the engine exhaust, water vapour from the exhaust will condense on those crystals, removing some of the water vapour from the exhaust gas.

An alternating potential difference (i.e. AC), a constant potential difference (i.e. DC) or any other waveform may be applied to the air. The periodic reversal of electrical polarity means that AC has two advantages of over DC. Firstly, the aircraft is overall electrically neutral instead of being electrically charged. Secondly, with AC the ice crystals which are formed bear opposite electrical charges. The oppositely charged ice crystals will experience forces of electrical attraction that encourage them to clump together and form larger particles, thereby dispersing the contrail more quickly.

The electrodes may be coated or plated with materials to aid ionization. For example, the electrodes may be coated with a metal having a low electric "work function" or a radioactive material. Furthermore, the seed electrode may be illuminated by radiation to achieve photo-electric emission from the electrode, particularly if it is coated with metal having a low work function. In addition, the region close to the seeding electrode may be illuminated. This may be done using radiation to ionize the air and so enhance the ionisation produced by the seeding electrodes.

The seeding electrodes may be moved up or down to vary the height of the electrodes above the engine exhaust. This would be used to control the point of entry of the seed ice crystals 16 into the engine exhaust gas in a manner as described above in relation to other embodiments The seeding electrodes may be pivoted so that the nozzle exhaust can be pitched up or down or yawed from side to side. The pitch angle may help control the point of entry of the seed ice crystals into the engine exhaust. The yaw angle may compensate for cross-winds. The stream of ions produced by the seeding electrodes may also be steered electrically using techniques similar to those used in cathode ray tubes (CRT). High voltage electrodes (not shown) can steer the stream of ions using high voltage electrostatic repulsion and attraction. Alternatively or in addition magnetic coils, superconducting or otherwise, or permanent magnets, superconducting or otherwise may be used to steer the stream using magnetic deflection according to Fleming's left hand law.

Whilst the seeding electrode placed above an engine has been described, a seeding electrode could be placed elsewhere on the aircraft in order to condense water from supersaturated ambient air as described above in relation to other embodiments.

The present invention may also be used in a number of other applications. For example, the invention may be applied to other exhausts such as the funnels of marine vessels and the chimneys and cooling towers of power stations and factories. In addition to removing water vapour, the present invention may also remove soot from these exhaust plumes. The visibility of the exhaust plume would be reduced and this would be useful to navies valuing stealth and electricity utilities wishing to reduce the visual impact of power stations.

Further applications for the present invention include cloud seeding, fog dispersal. For example, in order to produce rain, fertile clouds may be seeded with ice crystals instead of using dry ice or silver iodide. The ice seeding of the present invention could also be applied to a fog, particularly where it may be desirable for safety reasons for example at airports, and on roads and railways. Ice crystals may be directed into the fog to coalesce water droplets so that they will fall out of the fog to the ground. These applications would normally use ice crystal seeders 14 mounted on or close to the ground or perhaps on land vehicles or water vessels to clear a safe path through fog.

Possibly aircraft contrails could be dispersed by installing and operating radiation transmitters on the ground. There are several advantages of ground-mounted transmitters. Firstly, ground-mounted transmitters are not so constrained by weight and size. Secondly, the electrical power demand of ground-mounted transmitters can be generated more cheaply by electricity utilities than by aircraft. Thirdly the overall investment in contrail dispersion equipment would be less. Instead of each aircraft carrying its own contrail dispersion equipment yet using it infrequently, contrail dispersion equipment could be installed only in regions where air traffic is heavy and/or in regions where weather conditions are likely to cause persistent contrails.

If there is a seasonal pattern to the combination of air traffic and weather conditions likely to cause persistent contrails, portable radiation transmitters could be installed temporarily and moved seasonally. Similarly, portable or semi-permanently positioned radiation emitters could be established in a location for other reasons and according time periods as necessary. Radiation transmitters could additionally or alternatively be installed on water vessels for contrail dispersion over water, especially out of range of land based radiation transmitters.

Further still, the present invention may also be used for other applications relating to contrails, such as for example sky writing. It is known that relatively smaller aircraft can write in the sky by flying such that the contrail spells out letters. Contrail dispersion would help to form individual letters or other shapes more easily by effectively interrupting the contrail. Similarly, an aircraft could send messages to the ground by switching the contrail dispersion on and off to produce a contrail with trails and gaps according to a predetermined code. The mere presence or absence of a contrail or else an intermittent contrail could itself be used to provide a signal.

The invention claimed is:

1. An ice crystal seeding assembly arranged to reduce the amount of water in volume of gas due to an exhaust emission, the ice crystal seeding assembly comprising:
   an ice crystal seeder arranged to form or encourage the formation of seed ice crystals; and
   a directing means arranged to dispense the seed ice crystals towards the volume of gas so that water in said volume of gas freezes or deposits onto the seed ice crystals and that the resulting ice crystals move from the volume of gas so as to reduce the amount of water therein; and
   wherein the ice crystal seeder comprises an ion producer.

2. An ice crystal seeding assembly as claimed in claim 1, wherein the ion producer comprises a source of electrical energy for applying an electrical potential to the air so as to produce the ions.

3. An ice crystal seeding assembly as claimed in claim 1, wherein the directing means is pivotable and/or translatable so as to alter the direction in which the seed ice crystals are directed.

4. An ice seed crystal seeding assembly as claimed in claim 1 wherein ice crystal seeder is configured to form ice crystals substantially 1000 µm in diameter.

5. An ice crystal seeding assembly as claimed in claim 1, wherein the ion producer comprises a radiation transmitter.

6. An ice crystal seeding assembly as claimed in claim 5, wherein the radiation transmitter transmits one or more of microwaves, ultra-violet radiation, X-rays, gamma rays, corpuscular radiation and lasers.

7. A gas turbine engine comprising the ice crystal seeding assembly as claimed in claim 1.

8. A gas turbine engine as claimed in claim 7, wherein the seed ice crystals are dispended: above an engine of an aircraft, around the engine exhaust nozzle, within a bypass duct or on the aircraft wing, empennage or fuselage.

* * * * *